(12) United States Patent
Jia et al.

(10) Patent No.: US 10,039,223 B2
(45) Date of Patent: Aug. 7, 2018

(54) STRIP SOIL LOOSENING AND CRUSHING MECHANISM OF NO-TILLAGE PLANTING MACHINE

(71) Applicant: Jilin University, Changchun, Jilin (CN)

(72) Inventors: Honglei Jia, Jilin (CN); Mingzhuo Guo, Jilin (CN); Xuhui Fan, Jilin (CN); Hongfang Yuan, Jilin (CN); Hui Guo, Jilin (CN); Xinming Jiang, Jilin (CN); Jiale Zhao, Jilin (CN); Pengfei Yao, Jilin (CN); Xiaofeng Luo, Jilin (CN); Haibo Yu, Jilin (CN)

(73) Assignee: JILIN UNIVERSITY, Changchun, Jilin (CN)

( * ) Notice: Subject to any disclaimer, the term of this patent is extended or adjusted under 35 U.S.C. 154(b) by 107 days.

(21) Appl. No.: 15/163,115

(22) Filed: May 24, 2016

(65) Prior Publication Data
US 2016/0360690 A1 Dec. 15, 2016

(30) Foreign Application Priority Data

Jun. 10, 2015 (CN) .......................... 2015 1 0316928

(51) Int. Cl.
*A01B 49/02* (2006.01)
*A01B 15/16* (2006.01)
(Continued)

(52) U.S. Cl.
CPC ............ *A01B 49/027* (2013.01); *A01B 15/16* (2013.01); *A01B 15/18* (2013.01); *A01B 35/28* (2013.01);
(Continued)

(58) Field of Classification Search
CPC ...... A01B 49/027; A01B 35/28; A01B 49/041
(Continued)

(56) References Cited

U.S. PATENT DOCUMENTS

| | | | | |
|---|---|---|---|---|
| 1,054,899 A | * | 3/1913 | Bingham | ............... A01B 15/16 172/535 |
| 1,782,201 A | * | 11/1930 | Dunham | .............. A01B 29/041 172/187 |

(Continued)

FOREIGN PATENT DOCUMENTS

| | | |
|---|---|---|
| CN | 2912215 Y | 6/2007 |
| CN | 200947731 Y | 9/2007 |

(Continued)

OTHER PUBLICATIONS

Haitian Yang et al., "A Study on No-Till Precision Seeder"; Agricultural Development & Equipments, vol. (12), 2014, pp. 67-68.

*Primary Examiner* — Thomas B Will
*Assistant Examiner* — Joel F. Mitchell
(74) *Attorney, Agent, or Firm* — Novick, Kim & Lee, PLLC; Allen Xue

(57) ABSTRACT

A strip soil loosening and crushing mechanism of a no-tillage planting machine has a connecting bracket, a cutter head assembly, and a soil crushing wheel assembly. The cutter head assembly has two star-shaped cutter heads of the same structure, which are symmetrically arranged at outer sides of the two supporting plates. The soil crushing wheel assembly has a spring combined structure, a soil crushing wheel combined structure and two crank brackets rotatably connected at the outer sides of the two supporting plates of the connecting bracket by a connecting shaft.

7 Claims, 11 Drawing Sheets

(51) Int. Cl.
*A01B 15/18* (2006.01)
*A01B 35/28* (2006.01)
*A01C 5/06* (2006.01)
*A01B 5/04* (2006.01)
*A01B 49/04* (2006.01)
*A01C 7/00* (2006.01)

(52) U.S. Cl.
CPC ............... *A01C 5/064* (2013.01); *A01B 5/04* (2013.01); *A01B 49/04* (2013.01); *A01C 7/006* (2013.01); *Y02A 40/236* (2018.01); *Y02P 60/23* (2015.11)

(58) Field of Classification Search
USPC .......................................... 172/536; 111/139
See application file for complete search history.

(56) References Cited

U.S. PATENT DOCUMENTS

| | | | | |
|---|---|---|---|---|
| 2,274,438 | A * | 2/1942 | Stoner | A01B 15/18 172/603 |
| 2,603,049 | A * | 7/1952 | Mullin | A01B 5/06 172/535 |
| 5,640,914 | A * | 6/1997 | Rawson | A01B 49/06 111/140 |
| 6,068,061 | A * | 5/2000 | Smith et al. | A01B 13/08 172/139 |
| 6,237,696 | B1 | 5/2001 | Mayerle | |
| 6,871,709 | B2 * | 3/2005 | Knobloch et al. | A01B 13/025 172/145 |
| 7,240,627 | B1 * | 7/2007 | Whalen et al. | A01C 5/066 111/140 |
| 7,594,546 | B2 * | 9/2009 | Ankenman | A01B 29/06 172/540 |
| 7,810,580 | B2 * | 10/2010 | Swanson | A01C 5/064 172/535 |
| 8,393,407 | B2 * | 3/2013 | Freed | A01B 35/16 111/141 |
| 8,534,373 | B2 * | 9/2013 | Van Buskirk et al. | A01B 29/048 111/139 |
| 8,939,095 | B2 * | 1/2015 | Freed | A01B 49/027 111/164 |
| 2011/0108296 | A1 | 5/2011 | Schilling | |
| 2013/0192855 | A1 * | 8/2013 | Meek | A01B 27/005 172/146 |
| 2014/0224514 | A1 * | 8/2014 | Wealleans | A01B 29/045 172/539 |
| 2014/0230704 | A1 | 8/2014 | Zimmerman | |

FOREIGN PATENT DOCUMENTS

| | | |
|---|---|---|
| CN | 201409285 Y | 2/2010 |
| CN | 101773000 A | 7/2010 |
| CN | 102668752 A | 9/2012 |
| CN | 203040131 U | 7/2013 |
| CN | 203801224 U | 9/2014 |
| CN | 103039144 B | 10/2014 |
| CN | 104081898 A | 10/2014 |
| CN | 102657002 B | 11/2014 |
| CN | 204047046 U | 12/2014 |
| DE | 19534481 A1 | 5/1997 |

* cited by examiner

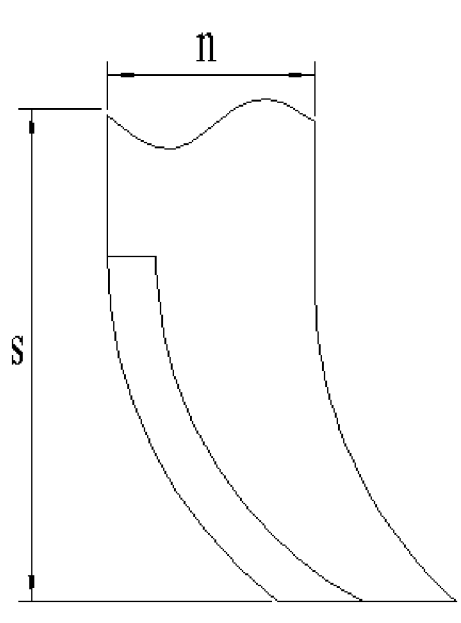
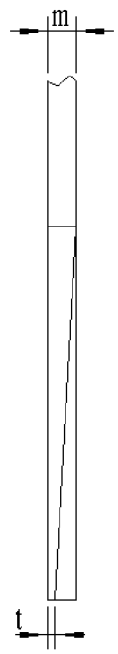
Figure 10                                        Figure 11
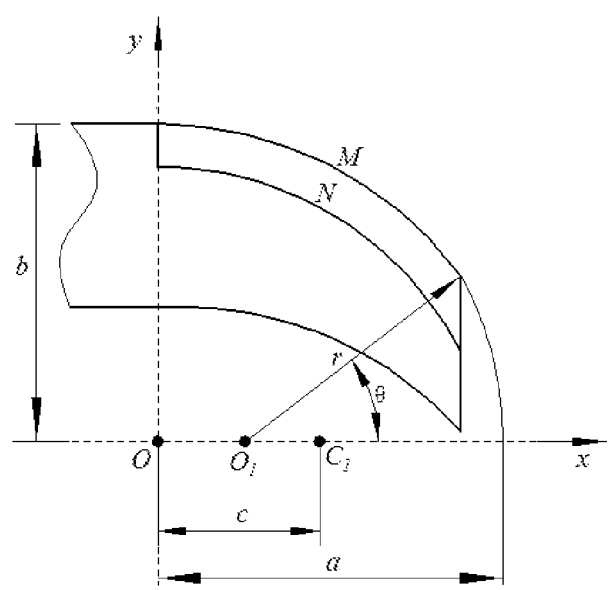
Figure 12

STRIP SOIL LOOSENING AND CRUSHING MECHANISM OF NO-TILLAGE PLANTING MACHINE

TECHNICAL FIELD

The present invention relates to the technical field of agricultural machinery, and particularly to a strip soil loosening and crushing mechanism of a no-tillage planter which can loosen and crush the strip soil in a seedbed, so that a desirable working condition of the seedbed is created and uniformity of sprouting and the emergence rate of seeds are improved.

BACKGROUND ART

No-tillage planting is a new sowing technique that sows directly on a soil surface which is covered by straw or stubble and free from ploughing in advance. As the no-tillage soil surface is relatively firm and covered by straw, usually there is a ploughing component or mechanism installed on a sowing element of a no-tillage planting machine. The ploughing component or mechanism can loosen the seedbed soil in strips, so that suitable ploughed conditions can be provided for following ditching, soil-covering and suppressing. Therefore, the ploughing component or mechanism is one of key parts for the no-tillage planting machine. To better perform no-tillage planting, the ploughing mechanism of the no-tillage planting machine should possess good performance in soil entering, stubble cutting and soil strip loosening and crushing.

Currently, soil treating mechanisms having a soil crushing function of existing agricultural machinery may be divided into an active rotation type and a passive rotation type. The active rotation type is mainly used in primary tillage equipment and scarification equipment, such as rotary blades (disclosed in the Chinese patent No. ZL201210138776.0) and stubble cutting blades (disclosed in the Chinese patent No. ZL200620077979.3). Such machinery treats a large amount of soil and the structures of ploughing layers are greatly destroyed, so it is not suitable for the no-tillage planting work. The passive-type soil crushing rollers (disclosed in the Chinese patent No. ZL201310000902.0), generally suitable for soil tillage and scarification machinery, are used to further crush the ploughed soil and do not have the soil loosening function. Therefore, such machinery is usually independently used and cannot co-operate with the no-tillage planting machine.

International mainstream no-tillage planting machines usually employ wavy disc coulter (disclosed in the Chinese patent No. ZL201010004737.2) as soil loosening members. Wavy disc coulter may be divided into wide wavy disc coulters and narrow wavy disc coulters according to the ploughing width. The wide wavy disc coulter has relatively large wrinkles which are stuck with much more seedbed soil when ploughing sticky and heavy soil. When working at high speeds, such coulters greatly destroy the structure of the ploughing layers, resulting in the sowing depth is non-uniform and seeds cannot properly contact with the soil, thereby affecting the emergence rate. The narrow wavy disc coulters have a relatively small range of corrugations, so the soil entering performance is good, and it throws less seedbed soil than the wide wavy disc coulter do. However, its soil loosening width is small, and the soil loosening effect is poor. Therefore, the narrow wavy disc coulters cannot provide good conditions for the followed sowing.

Both the wide and narrow wavy disc coulter can only work in certain conditions. In addition, owing to their specific structures, wavy disc coulters can only loosen rather than crush the soil. Loosened soil blocks can easily form air cavities, so that sufficient contact between the soil and seeds cannot be provided, and moisture in the seedbed evaporates easily, affecting sprouting of seeds.

CONTENTS OF THE INVENTION

To overcome the above shortcomings of the related arts, this invention provides a strip soil loosening and crushing mechanism of a no-tillage planting machine of a compact structure and mounted at the front end of a sowing element of the no-tillage planting machine. When the no-tillage planting machine moves forward, strip soil loosening and crushing is performed in a sowing area in advance, so that a desirable working condition of the seedbed is created, and uniformity of sprouting and the emergence rate of seeds are improved.

The objective of this invention is realized by the following solutions.

There is provided a strip soil loosening and crushing mechanism of a no-tillage planting machine, comprising: a connecting bracket, a star-shaped cutter head assembly, and a soil crushing wheel assembly, wherein the connecting bracket comprises a fixing plate and two parallel supporting plates vertically fixed at a front end of the fixing plate; the star-shaped cutter head assembly comprises two star-shaped cutter heads with the same structure, wherein the two star-shaped cutter heads with the same structure are symmetrically arranged at outer sides of the two supporting plates by star-shaped cutter head fixing shafts, and are fixed aslant in a vertical direction as their lower ends incline inwards; the soil crushing wheel assembly comprises a spring combined structure, a soil crushing wheel combined structure and two crank brackets, wherein the two crank brackets are rotatably connected at the outer sides of the two supporting plates of the connecting bracket by a second connecting shaft, the spring combined structure is fixed at top surfaces of the two supporting plates, a front end of the spring combined structure is rotatably connected to upper arms of the two crank brackets by a first connecting shaft, and the soil crushing wheel combined structure is rotatably connected to lower arms of the two crank brackets by a rotary shaft and is disposed below the connecting bracket.

In the strip soil loosening and crushing mechanism of the no-tillage planting machine according to this invention, the star-shaped cutter head fixing shaft of the star-shaped cutter head assembly is fixedly connected at the outer side of the supporting plate; the star-shaped cutter head and the star-shaped cutter head fixing shaft are connected by a bearing, which is installed in a bearing housing and is in interference fit with the star-shaped cutter head fixing shaft; the bearing housing is connected to an outer surface of the star-shaped cutter head by bolts; an inner surface of the star-shaped cutter head abuts against a shaft shoulder of the star-shaped cutter head fixing shaft; and a fastening nut is provided at a tip of the star-shaped cutter head fixing shaft to limit a position of the star-shaped cutter head. In the strip soil loosening and crushing mechanism of a no-tillage planting machine according to this invention, the star-shaped cutter head comprises a cutter head base and multiple cutting edge pieces extending from the cutter head base, a cutting edge curve of the cutting edge pieces is a circle-like curve.

In the strip soil loosening and crushing mechanism of a no-tillage planting machine according to this invention, the spring combined structure of the soil crushing wheel assembly comprises pulling rods, gaskets, springs, a baffle and pulling rod splints, wherein the baffle is vertically fixed at the top surfaces of the two supporting plates of the connecting bracket; the pulling rod passes through a through-hole of the baffle and is fixedly connected to the pulling rod splint; the pulling rod splint is rotatably connected to the upper arms of the two crank brackets by the first connecting shaft; the spring is fitted over a pulling rod and two ends of the spring abut against the baffle and the gasket respectively; and a position of the gasket is limited by a nut fastened at a tip of the pulling rod.

In the strip soil loosening and crushing mechanism of a no-tillage planting machine according to this invention, the soil crushing wheel combined structure of the soil crushing wheel assembly comprises a wavy disc coulter, a first tooth-shaped soil crushing roller and a second tooth-shaped soil crushing roller, wherein the first and second tooth-shaped soil crushing rollers clamp the wavy disc coulter and are connected by bolts; axial projections of tooth tips of the first and second tooth-shaped soil crushing rollers are evenly and alternately distributed; and a radial dimension of the wavy disc coulter head is greater than that of the tooth-shaped soil crushing rollers.

In the strip soil loosening and crushing mechanism of a no-tillage planting machine according to this invention, the wavy disc coulter is composed of four wavy disc coulter head pieces evenly distributed and installed between the first and second tooth-shaped soil crushing rollers.

In the strip soil loosening and crushing mechanism of a no-tillage planting machine according to this invention, four recesses are provided in inner sides of the first and second tooth-shaped soil crushing rollers respectively; and a shape of the recess matches with a shape of the part of the wavy disc coulter head piece that cooperates with the recess.

This invention has the following advantageous effects over the prior arts:

1. The strip soil loosening and crushing mechanism of the no-tillage planting machine according to this invention can be mounted at the front end of the sowing element of the no-tillage planting machine. Before sowing, strip-type soil loosening and crushing is performed to the soil in a sowing range of the seedbed strip, so that a desirable seedbed with the loosened and crushed soil is created.

2. By integrating the star-shaped cutter head assembly and the soil crushing wheel assembly, the strip soil loosening and crushing mechanism of the no-tillage planting machine according to this invention has a compact structure. When the sowing element moves forward, the seedbed is cut by the two star-shaped cutter heads that are symmetrically installed, the strip soil is pried, then the soil crushing wheel assembly further crushes the loosened strip soil to form loosened and crushed soil, so that seeds can sufficiently contact the soil.

3. The cutting edge curve of the star-shaped cutter head according to this invention has good sliding-cutting performance. The cutting edge pieces are made of a spring steel material, and can be elastically deformed to pry the soil.

4. The soil crushing wheel assembly according to this invention uses the spring over-load protection device. When stones are encountered in the soil crushing, a buffering effect can be generated to some extent to avoid damages to the teeth, thereby extending the service life of the soil crushing wheel assembly.

5. By arranging interlaced the two soil crushing rollers, the soil crushing range is expanded, and the soil crushing efficiency is improved.

6. The tooth-shaped soil crushing rollers of the soil crushing wheel assembly according to this invention is designed as a tooth root circle radius, a tooth top circle radius and an included angle of the tooth tip can be changed, so that soil crushing effect can be changed in various soil conditions.

7. The wavy disc coulter head piece according to this invention has a fan-shaped structure. Four wavy disc coulter head pieces form one group, so that materials are saved and their maintenance is easier. The flat part of the wavy disc coulter head piece is installed in the recess between the two tooth-shaped soil crushing rollers, and the wavy part is located beyond the tooth top circle of the tooth-shaped soil crushing rollers, so that soil blocks can be cut first, and the cut soil blocks can be further crushed by the tooth-shaped soil crushing rollers arranged at the two sides of the coulter head pieces, thereby improving the soil crushing ability and efficiency.

BRIEF DESCRIPTION OF THE DRAWINGS

FIG. 10 is a axial view showing the structure of a cutting edge piece of the first star-shaped cutter head;

FIG. 11 is a front view showing the structure of the cutting edge piece of the first star-shaped cutter head;

FIG. 12 shows the curve parameters of the cutting edge piece;

DETAILED DESCRIPTION OF THE EMBODIMENTS

The followings will further describe this invention with reference to the accompanying figures.

Figure 1:
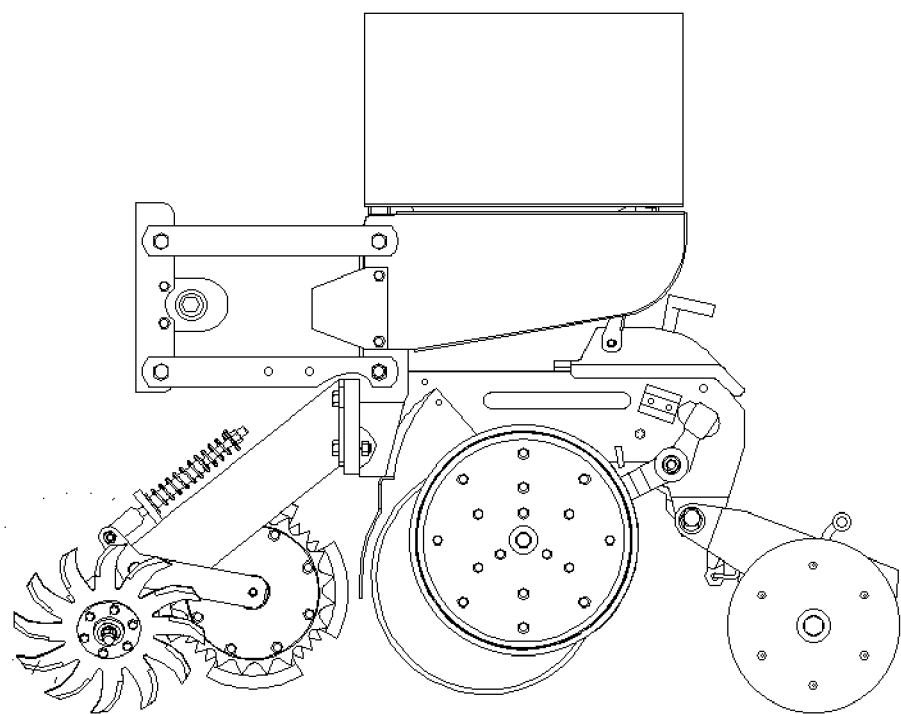
FIG. 1 shows a strip soil loosening and crushing mechanism of a no-tillage planting machine assembled to the no-tillage planting machine.

As shown in FIG. 1, a strip soil loosening and crushing mechanism of a no-tillage planting machine is assembled to front end of a sowing element of the no-tillage planting machine, and is used to loosen and crush soil in a sowing range in advance when the no-tillage planting machine moves forward.

Figure 2:
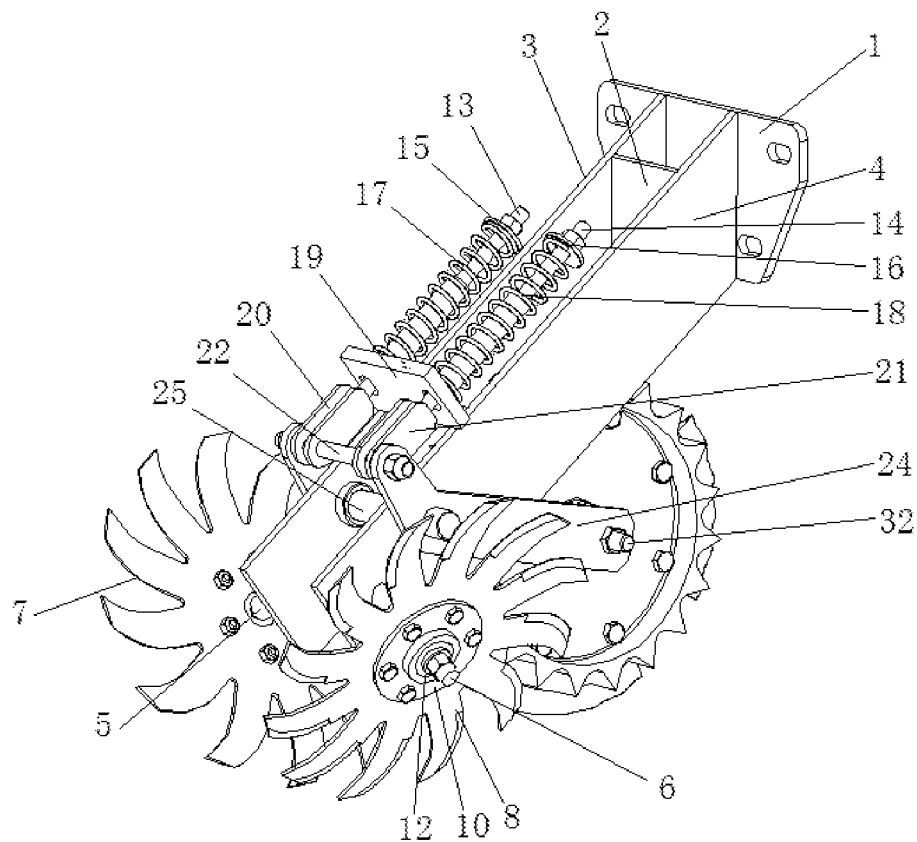
FIG. 2 is an axonometric view of the strip soil loosening and crushing mechanism of the no-tillage planting machine.

As shown in FIG. 2, the strip soil loosening and crushing mechanism of a no-tillage planting machine comprises a connecting bracket, a star-shaped cutter head assembly, and a soil crushing wheel assembly. The connecting bracket comprises a fixing plate and two parallel supporting plates vertically disposed at a front end of the fixing plate. A first star-shaped cutter head 7 of the star-shaped cutter head assembly is arranged at an outer side of a first supporting plate 3 of the connecting bracket by a first star-shaped cutter head fixing shaft 5; a second star-shaped cutter head 8 of the star-shaped cutter head assembly is arranged at an outer side of a second supporting plate 4 of the connecting bracket by a second star-shaped cutter head fixing shaft 6; and the two star-shaped cutter heads 7 and 8 are fixed while their lower ends are inclined inwards in a vertical direction. A first crank bracket 23 and a second crank bracket 24 of the soil crushing wheel assembly are arranged at outer sides of the first and second supporting plates 3 and 4 respectively. A second connecting shaft 25 connects the first crank bracket 23, the first supporting plate 3, the second supporting plate 4 and the second crank bracket 24 together, so that the two crank brackets can rotate relative to the two supporting plates. A spring combined structure of the soil crushing wheel assembly is fixed at top surfaces of the two supporting plates 3 and 4 through a baffle 19. A front end of the spring combined structure is connected to upper arms of the two crank brackets by a first connecting shaft 22. The soil crushing wheel combined structure of the soil crushing wheel assembly is rotatably connected to lower arms of the two crank brackets by a soil crushing wheel shaft 32 and is disposed below the connecting bracket.

As shown in FIG. 2, the connecting bracket comprises a fixing plate 1, a rib plate 2, the first supporting plate 3 and the second supporting plate 4. The first supporting plate 3 and the second supporting plate 4 are vertically and fixedly connected to a front end of the fixing plate 1. The rib plate 2 is fixedly connected between the first supporting plate 3 and the second supporting plate 4 and is parallel with the fixing plate 1.

Figure 3:
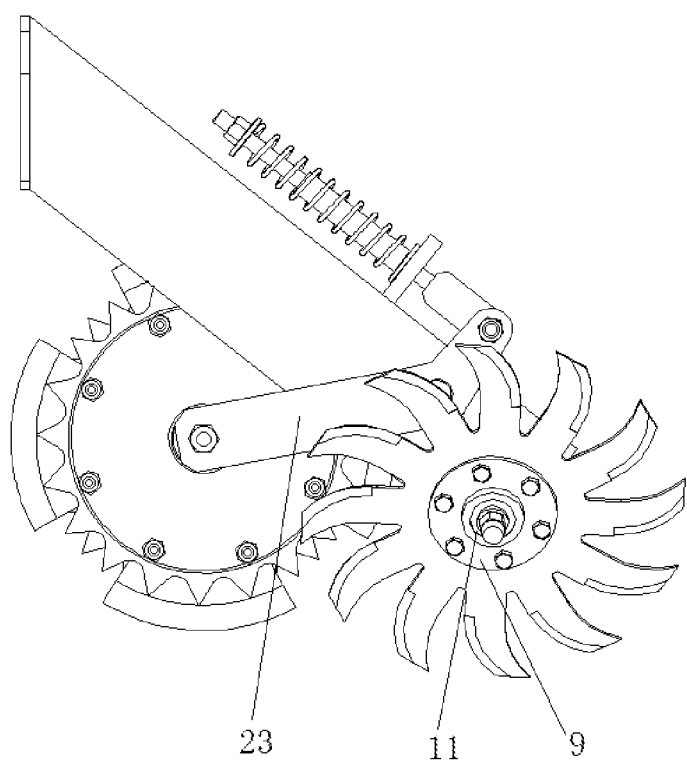
FIG. 3 is a side view of the strip soil loosening and crushing mechanism of the no-tillage planting machine.
Figure 4:
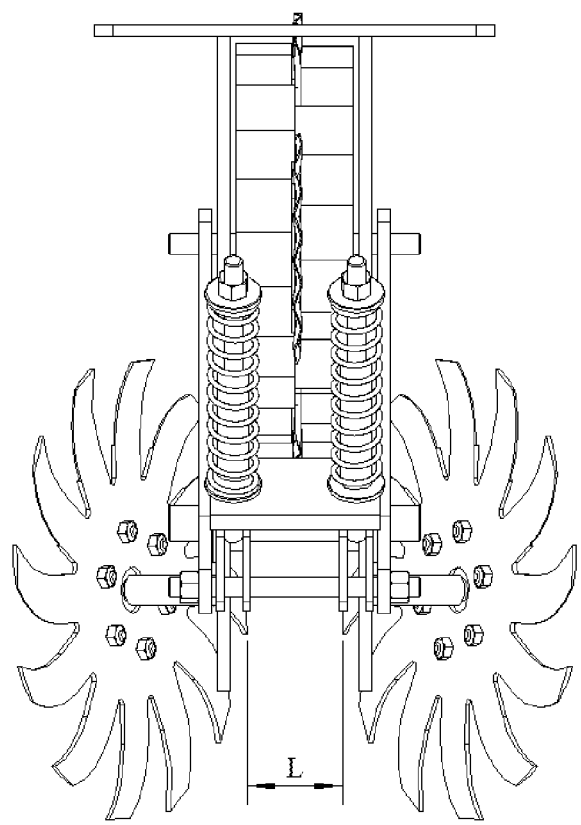
FIG. 4 is a plan view of the strip soil loosening and crushing mechanism of the no-tillage planting machine.

As shown in FIGS. 2-4, the star-shaped cutter head assembly comprises the first star-shaped cutter head 7, the second star-shaped cutter head 8, the first star-shaped cutter head fixing shaft 5, the second star-shaped cutter head fixing shaft 6, a first bearing housing 9, a second bearing housing 10, a first bearing 11 and a second bearing 12. The first star-shaped cutter head fixing shaft 5 and the second star-shaped cutter head fixing shaft 6 are respectively fixed at outer sides of front ends of the first supporting plate 3 and the second supporting plate 4, and are fixed as they incline inwards in the vertical direction with a fixed angle relative to the supporting plates. Extension lines of the two axes of the first star-shaped cutter head fixing shaft 5 and the second star-shaped cutter head fixing shaft 6 intersect at one point. A plane determined by the two axes of the first star-shaped cutter head fixing shaft 5 and the second star-shaped cutter head fixing shaft 6 is parallel with the fixing plate 1. An included angle between the two axes of the first star-shaped cutter head fixing shaft 5 and the second star-shaped cutter head fixing shaft 6 is 80-150 degrees. The first star-shaped cutter head fixing shaft 5 and the second star-shaped cutter head fixing shaft 6 are stepped shafts to facilitate connection and fixing with the star-shaped cutter heads. The first star-shaped cutter head 7 is fitted over the first star-shaped cutter head fixing shaft 5. The back side of the first star-shaped cutter head 7 abuts against a shaft shoulder of the first star-shaped cutter head fixing shaft 5. An outer side of the first star-shaped cutter head 7 is connected to the first bearing housing 9 by a bolt. An outer ring of the first bearing 11 is fixedly connected to the first bearing housing 9. The first star-shaped cutter head fixing shaft 5 is in interference fit with the first bearing 11. A shaft end of the first star-shaped cutter head fixing shaft 5 is provided with a fastening nut. The position of the star-shaped cutter head is limited by fastening the fastening nut to make the fastening nut abut against the first bearing housing 9. The second star-shaped cutter head 8 is fitted over the second star-shaped cutter head fixing shaft 6. The back side of the second star-shaped cutter head 8 abuts against a shaft shoulder of the second star-shaped cutter head fixing shaft 6. The second star-shaped cutter head 8 is connected to the second bearing housing 10 by a bolt. An outer ring of the second bearing 12 is fixedly connected to the second bearing housing 10. The second star-shaped cutter head fixing shaft 6 is in interference fit with the second bearing 12. A shaft end of the second star-shaped cutter head fixing shaft 6 is provided with a fastening nut to limit the star-shaped cutter head. A horizontal distance between the lowermost parts of the first star-shaped cutter head 7 and the second star-shaped cutter head 8 which contact the soil is 60-90 mm, so that soil strips with a width of at least 60-100 mm can be cut while working. A thickness of the first bearing housing 9 and the second bearing housing 10 is 4-10 mm. Each bearing housing is fixed to a star-shaped cutter head by 6 bolts. The first bearing 11 is fixedly connected to the first star-shaped cutter head 7 by bolts. The second bearing 12 is fixedly connected to the second star-shaped cutter head 8 by bolts. The first star-shaped cutter head 7 and the second star-shaped cutter head 8 are made of a spring steel material, and can be elastically deformed when entering into the soil. After entering into the soil, the cutting edge pieces of the cutter heads are elastically deformed to pry and lift the soil; when leaving the soil, the cutting edge pieces of the cutter heads are restored to their original shape, and the soil is gradually released in this process, thereby producing a soil loosening effect.

Figure 8:
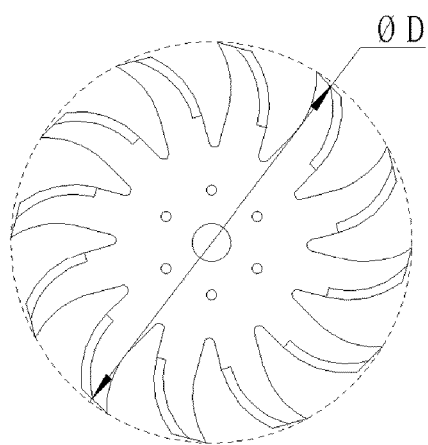
FIG. 8 is a schematic axial view of a first star-shaped cutter head.
Figure 9:
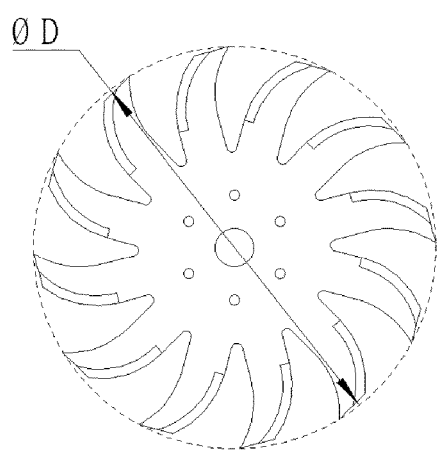
FIG. 9 is a schematic axial view of a second star-shaped cutter head.

FIGS. 8-9 show the structures of the first star-shaped cutter head 7 and the second star-shaped cutter head 8. The star-shaped cutter heads are connected to the bearing housings by bolts through six installation holes around the cutter head centers. An outer diameter D of the star-shaped cutter heads is 280-300 mm. Each star-shaped cutter head comprises a cutter head base and multiple independent cutting edge pieces extending from the cutter head base. The number of cutting edge pieces is usually 8-12.

The cutting edge pieces of the first star-shaped cutter head 7 are described with reference to FIGS. 10-11. The cutter head has a thickness m of 2-4 mm. The cutting edge of the cutting edge pieces of the star-shaped cutter head has a thickness t of 1-2 mm. The cutting edge pieces of the star-shaped cutter head have a length s of 60-70 mm. The stem of the cutting edge pieces of the star-shaped cutter head has a width n of 30-50 mm. The cutting edge curves of the first star-shaped cutter heads 7 and the second star-shaped cutter heads 8 are circle-like curves. That is, circle-like curves are designed for the cutting edge curves of the cutter heads, so that the soil entering performance of the cutting edge pieces is ensured, and a sliding-cutting effect is generated to improve the efficiency.

FIG. 12 shows the curve parameters of a cutting edge piece. The M curve is a cutting edge curve of the star-shaped cutter head. The N curve is a lateral cutting edge curve of the star-shaped cutter head. The M and N curves have the same curve shape. A distance between the M and N curves is a transition length of a cutting edge. Both M and N curves are circle-like curves. Take the M curve as an example. The parameter formula of the M curve is:

$$r = a \frac{\sqrt{(1-\varepsilon^2)[(1-\varepsilon^2\cos^2(n\theta)-e^2\sin^2(n\theta)]}}{1-\varepsilon^2\cos^2(n\theta)} - a\frac{e(1-\varepsilon^2)\cos(n\theta)}{1-\varepsilon^2\cos^2(n\theta)},$$

wherein the point O is the geometrical center of an elliptic curve, the point $C_1$ is a focus of the elliptic curve on a positive axis of the x axis, the point $O_1$ is one of the focuses of the ellipse, a is the semi-major axis of the elliptic curve, and b is the semi-minor axis of the elliptic curve. The rotating center $O_1$ is selected as the pole of the polar coordinates, $O_1X$ as the polar axis of the polar coordinates, and $OO_1$ as the eccentric distance. The eccentric ratio $$e = \frac{OO_1}{a},$$

the centrifugal ratio $$\varepsilon = \frac{c}{a} = \frac{\sqrt{a^2-b^2}}{a},$$

r is a radius vector of the curve, the centrifugal ratio $0<\varepsilon<0.8$, the eccentric ratio $0<e<0.2$, the polar angle $20°<\theta<28°$, $1\leq n\leq 1.1$, 55 mm$<a<$65 mm, 25 mm$<c<$31 mm, and 50 mm$<b<$52 mm.

Figure 5:
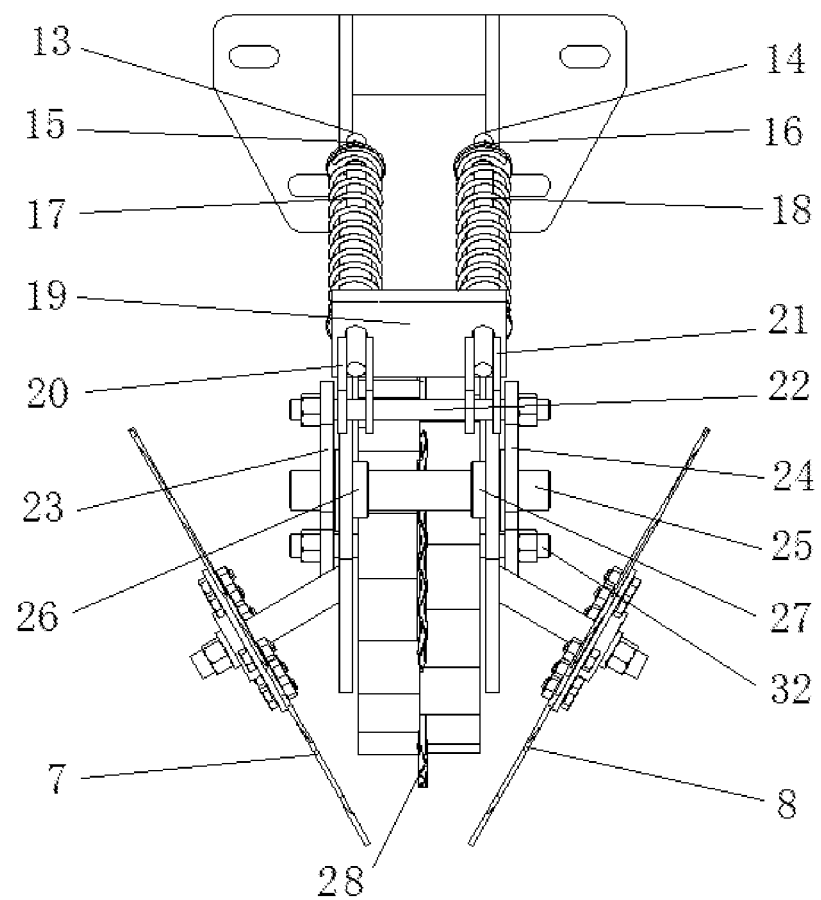
FIG. 5 is a front view of the strip soil loosening and crushing mechanism of the no-tillage planting machine.
Figure 6:
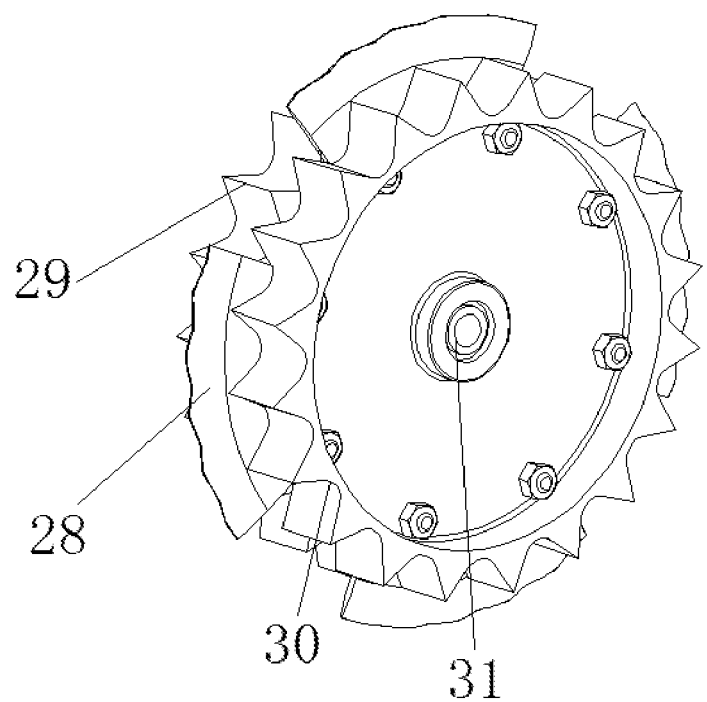
FIG. 6 shows the structure of a soil crushing wheel piece.

As shown in FIGS. 2, 5 and 6, the soil crushing wheel assembly comprises a spring combined structure, a soil crushing wheel combined structure, a first connecting shaft 22, a first crank bracket 23, a second crank bracket 24, a second connecting shaft 25, a first sleeve 26 and a second sleeve 27. The spring combined structure comprises a first pulling rod 13, a second pulling rod 14, a first gasket 15, a second gasket 16, a first spring 17, a second spring 18, a baffle 19, a first pulling rod splint 20 and a second pulling rod splint 21. The baffle 19 is vertically fixed at top surfaces of the first supporting plate 3 and the second supporting plate 4. The first pulling rod 13 passes a left hole of the baffle 19 and is fixedly connected to the first pulling rod splint 20. The first spring 17 is fitted over a periphery of the first pulling rod 13, and two ends of the first spring 17 abut against the baffle 19 and the first gasket 15 respectively. The position of the first gasket 15 is limited by a nut fixed at a top end of the first pulling rod 13. The second pulling rod 14 passes a right hole of the baffle 19 and is fixedly connected to the second pulling rod splint 21. The second spring 18 is fitted over a periphery of the second pulling rod 14, and two ends of the second spring 18 abut against the baffle 19 and the second gasket 16 respectively. The positions of the second gasket 16 are limited by a nut fixed at a top end of the second pulling rod 14. The first pulling rod splint 20 and the second pulling rod splint 21 are rotatably connected to the upper arms of the first crank bracket 23 and the second crank bracket 24 through the first connecting shaft 22. The two ends of the first connecting shaft 22 are fastened by bolts. The first sleeve 26 is fixedly connected to the first supporting plate 3, and the second sleeve 27 is fixedly connected to the second supporting plate 4. The second connecting shaft 25 connects the first crank bracket 23, the first supporting plate 3, the first sleeve 26, the second sleeve 27, the second supporting plate 4 and the second crank bracket 24, so that a lever effect can be produced when the soil crushing wheel assembly is working. The spring combined structure of the soil crushing wheel assembly prevents the whole soil loosening and crushing mechanism from being lifted when hard stones are encountered during working. When hard stones are encountered, only the soil crushing wheel combined structure is lifted in a certain range due to the pressure of the spring, so that the star-shaped cutter head assembly can continue cutting soil. Further, the service life of a wavy disc coulter 28 can be extended in the presence of the spring device.

The soil crushing wheel combined structure comprises the wavy disc coulter 28, a first tooth-shaped soil crushing roller 29, a second tooth-shaped soil crushing roller 30, a soil crushing wheel bearing 31 and a soil crushing wheel rotary shaft 32. The first tooth-shaped soil crushing roller 29, the wavy disc coulter 28 and the second tooth-shaped soil crushing roller 30 are sequentially connected by bolts. Axial projections of the two tooth-shaped soil crushing rollers are alternately distributed. The wavy disc coulter 28 is formed of four wavy disc coulter head pieces that are evenly distributed in an axial projection plane. The soil crushing wheel bearing 31 is installed in the center of the first tooth-shaped soil crushing roller 29 and the second tooth-shaped soil crushing roller 30, and is fixed on the soil crushing wheel rotary shaft 32.

Figure 7:
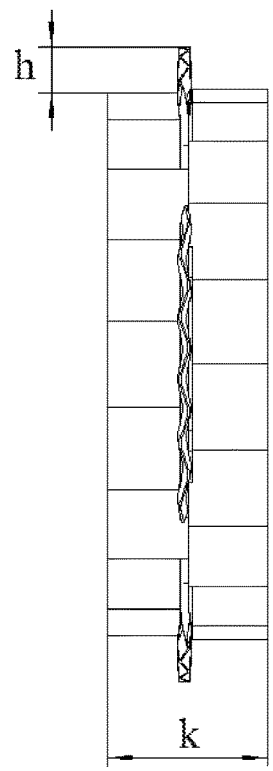
FIG. 7 shows the structure of the soil crushing wheel piece from its forward-moving direction.

As shown in FIG. 7, after the first tooth-shaped soil crushing roller, the second tooth-shaped soil crushing roller and the wavy disc coulter head pieces are assembled, the total working width k is 68-88 mm, and a radial dimension h of the wavy structure is greater than that of the tooth-shaped soil crushing roller by 25-30 mm, so that the wavy structure will not interfere with a tooth tip structure of the tooth-shaped soil crushing roller.

Figure 13:
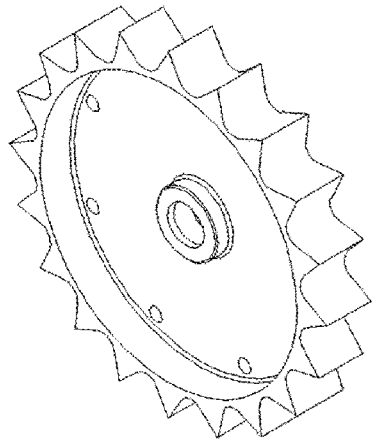
FIG. 13 shows an external structure of a first tooth-shaped soil crushing roller.
Figure 14:
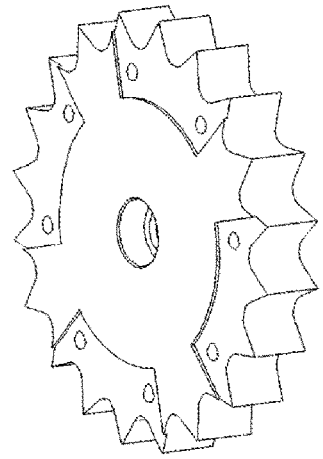
FIG. 14 shows an internal structure of the first tooth-shaped soil crushing roller.

FIGS. 13-14 show the structure of the first tooth-shaped soil crushing roller 29. The periphery of the roller is enclosed by a tooth structure. Soil is loosened and crushed by movement of the tooth tip. A radius of the tooth top circle is 130 mm, a radius of a tooth root circle is 110 mm, the tooth tip has a height of 20 mm, and the roller has a width of 30-38 mm. The first tooth-shaped soil crushing roller 29 is fixed to the second tooth-shaped soil crushing roller 30 at its tooth stem by eight bolts. FIG. 14 shows an internal structure of the tooth-shaped soil crushing roller. To ensure installation of the wavy disc coulter, recesses with a depth of 1-2 mm corresponding to the shape of the wavy disc coulter are provided. A shape of the recess matches with a shape of a part of the wavy disc coulter head piece that matches with the recess, so that four wavy disc coulter head pieces can be evenly installed at the inner sides of the two tooth-shaped soil crushing rollers. After fixing by bolts, soil will not fill a space between the tooth-shaped soil crushing rollers and the wavy disc coulter head pieces when working, thereby preventing blocking by soil.

Figure 15:
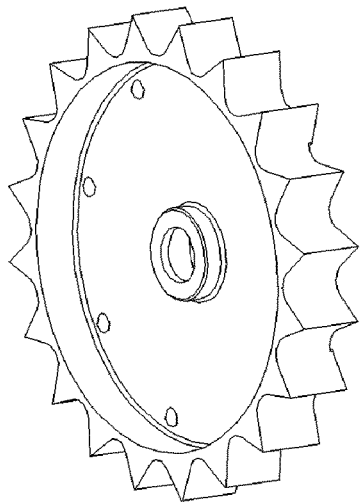
FIG. 15 shows an external structure of a second tooth-shaped soil crushing roller.
Figure 16:
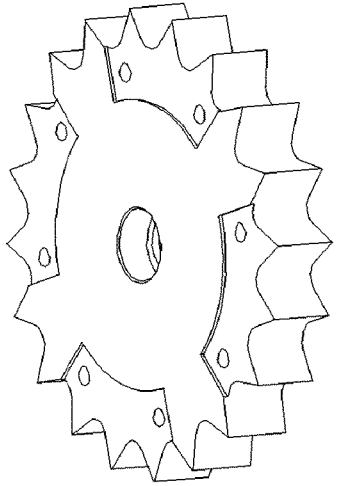
FIG. 16 shows an internal structure of the second tooth-shaped soil crushing roller.

The second tooth-shaped soil crushing roller 30 shown in FIGS. 15-16 has similar external structures and internal structures with those of the first tooth-shaped soil crushing roller 29. The difference is that the positions of the recesses for the wavy disc coulter head pieces at the inner sides of the soil crushing rollers and the positions of the installation holes are different. After the two rollers are assembled, axial projections of the teeth are interlaced so that soil can be sufficiently crushed when working.

Figure 17:
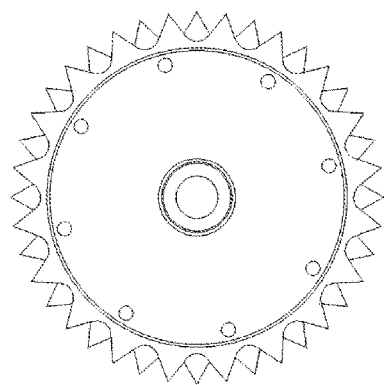
FIG. 17 shows an axial projection of the first and the second tooth-shaped soil crushing rollers when they are assembled together.

FIG. 17 shows an axial projection when the first tooth-shaped soil crushing roller 29 and the second tooth-shaped soil crushing roller 30 are assembled together, wherein the tooth tips of the two rollers are interlaced evenly.

Figure 18:
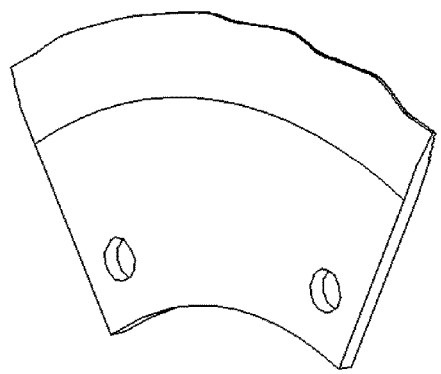
FIG. 18 shows the structure of a wavy disc coulter head piece.
Figure 19:
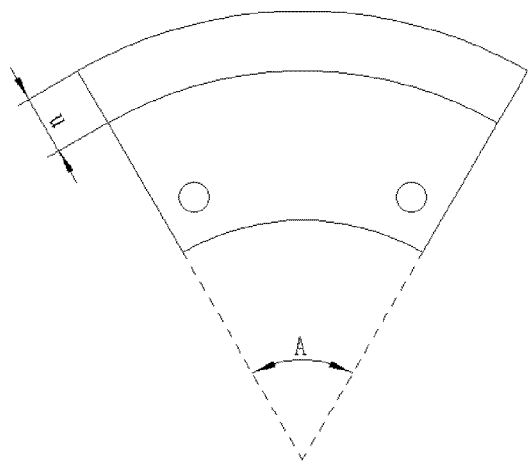
FIG. 19 is a side view of the wavy disc coulter head piece.
Figure 20:
FIG. 20 is a front view of the wavy disc coulter head piece.

FIGS. 18-20 respectively show the structure of the wavy disc coulter head piece. The wavy disc coulter head piece is a sector-shape structure. Wavy structure of each wavy disc coulter head piece is located at the edges. Two installation holes are provided at an inner flange of each wavy disc coulter head piece. The wavy disc coulter head pieces are assembled with the first tooth-shaped soil crushing roller 29 and the second tooth-shaped soil crushing roller 30 and fixed by bolts. The wavy structures of the assembled wavy disc coulter head pieces do not interfere with the tooth tips of the tooth-shaped soil crushing rollers. The wavy structure has a height u of 20-30 mm. A sector angle A of each wavy disc coulter head piece is 40-70 degrees.

Figure 21:
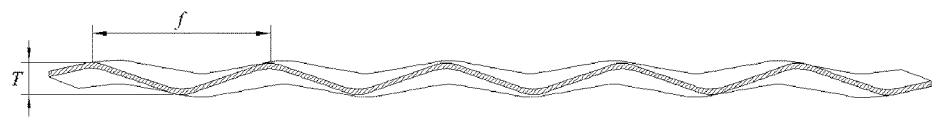
FIG. 21 shows a plan view of the wavy disc coulter head piece.

FIG. 21 shows a plan view of the wavy disc coulter head piece. T refers to a lateral thickness of the corrugations, and T=4-6 mm. f refers to a length of each wavelength, and f=20-50 mm.

Figure 22:
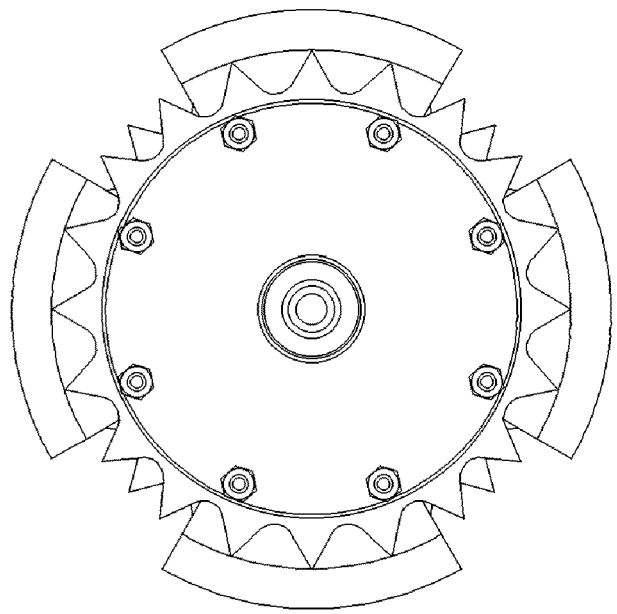
FIG. 22 shows an axial projection of a soil crushing wheel.

FIG. 22 shows an axial projection of a soil crushing wheel. After the first tooth-shaped soil crushing roller 29, the second tooth-shaped soil crushing roller 30 and the wavy disc coulter 28 are assembled together, the first tooth-shaped soil crushing roller 29 and the second tooth-shaped soil crushing roller 30 are circumferentially interlaced. The four wavy disc coulter head pieces are evenly installed between the two tooth-shaped soil crushing rollers, and rotate passively due to forward movement of the sowing machine. The wavy disc coulter head contacts with soil first, and cuts the strip soil. Then, the first tooth-shaped soil crushing roller 29 and the second tooth-shaped soil crushing roller 30 crush the soil.

Figure 23:
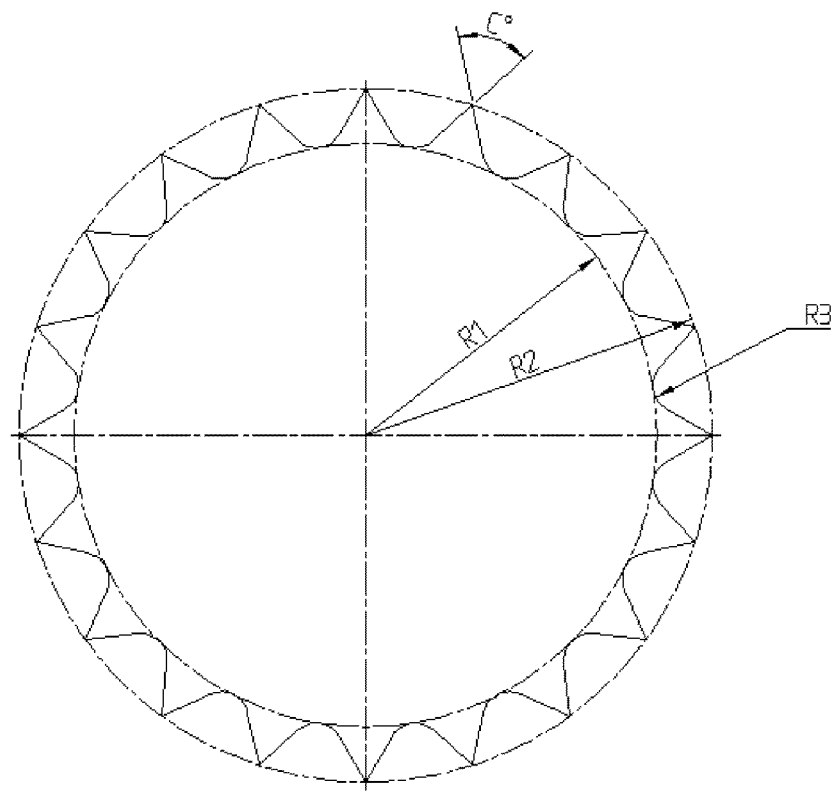
FIG. 23 shows the curve parameters of the tooth-shaped soil crushing roller, wherein in the above figures, 1-fixing plate, 2-rib plate, 3-first supporting plate, 4-second supporting plate, 5-first star-shaped cutter head fixing shaft, 6-second star-shaped cutter head fixing shaft, 7-first star-shaped cutter head, 8-second star-shaped cutter head, 9-first bearing housing, 10-second bearing housing, 11-first bearing, 12-second bearing, 13-first pulling rod, 14-second pulling rod, 15-first gasket, 16-second gasket, 17-first spring, 18-second spring, 19-baffle, 20-first pulling rod splint, 21-second pulling rod splint, 22-first connecting shaft, 23-first crank bracket, 24-second crank bracket, 25-second connecting shaft, 26-first sleeve, 27-second sleeve, 28-wavy disc coulter, 29-first tooth-shaped soil crushing roller, 30-second tooth-shaped soil crushing roller, 31-soil crushing wheel bearing, 32-soil crushing wheel rotary shaft.

FIG. 23 shows the curve parameters of the tooth-shaped soil crushing roller. R1 is a radius of a tooth root circle, R2 is a radius of a tooth tip circle, R1=90-120 mm, R2=110-140 mm, and a tooth height D=R2-R1. A tooth root transition radius R3=5-15 mm. The angle C is the tooth tip angle. A ratio of the tooth height D to the tooth tip circle R2 is 0.1-0.3. The tooth shape can be changed by changing the ratio of the tooth height D to the tooth tip circle R2 according to different working conditions, so that soil loosening and crushing can be performed under different soil conditions.

The working principle of the present mechanism after entering into soil is described as below with reference to FIGS. 1-3.

The strip soil loosening and crushing mechanism is mounted at the front end of the sowing element of the no-tillage planting machine. As the no-tillage planting machine moves forward, the first star-shaped cutter head 7 and the second star-shaped cutter head 8 obliquely rotate and cut into the soil to cut soil strips having a width of 60-100 mm and a depth of 60-90 mm. The star-shaped cutter heads are made of spring steel material. As the depth that the cutter head cutting edge pieces enter the soil increases, a bending torque generated from the soil increases, and an inward deformation volume of the cutter head cutting edge pieces also increases gradually, so that the soil is pried and the soil strips are formed. When the cutter head cutting edge pieces leave the soil, the elastic deformation volume gradually decreases, and the lifted soil strips fall down to form segmented soil strips. Then, the soil crushing wheels further crush the segmented soil strips. First, the wavy disc coulter cuts the center of the soil strip by the wavy structure and meanwhile, the left and right soil crushing rollers further crush the cut soil. When loosening and crushing the soil, even though hard stones are encountered, the damages to the wavy disc coulter head and the tooth tips of the soil crushing wheels can be prevented because of the buffering effect of the spring structure, and the whole mechanism is prevented from being lifted, resulting in a failure of soil crushing. The soil strips are sufficiently crushed by the present mechanism, so that good seedbed conditions are created.

We claim:

1. A strip soil loosening and crushing mechanism for a no-tillage planting machine, comprising:
    a connecting bracket, a cutter head assembly, and a soil crushing wheel assembly,
    wherein the connecting bracket comprises a fixing plate and a first supporting plate and a second supporting plate vertically installed at a front end of the fixing plate, and the first and second supporting plates are parallel to each other,
    wherein the cutter head assembly comprises a first cutter head and a second cutter head of a same structure, wherein a first cutter head fixing shaft is connected to a center of the first cutter head at one end and to the first supporting plate at the other end, and a second cutter head fixing shaft is connected to a center of the second cutter head at one end and to the second supporting plate at the other end,
    wherein a portion of the first cutter head positioned lower than the center of the first cutter head is tilted toward the first supporting plate and a portion of the first cutter head positioned higher than the center of the first cutter head is titled away from the first supporting plate,
    wherein a portion of the second cutter head positioned lower than the center of the second cutter head is tilted toward the second supporting plate and a portion of the second cutter head positioned higher than the center of the second cutter head is titled away from the second supporting plate,
    wherein the first and second cutter heads are symmetrically arranged across the first and second supporting plates so that an imaginary straight line connecting the center of the first cutter head and the center of the second cutter head is perpendicular to the first and second supporting plates, wherein the soil crushing wheel assembly comprises a spring combined structure, a soil crushing wheel combined structure, a first crank bracket and a second crank bracket, wherein the first and second crank brackets respectively are rotatably connected to the first and second supporting plates via a second connecting shaft, the spring combined structure is affixed to the first and second supporting plates, a front end of the spring combined structure is rotatably connected to the first and second crank brackets and via a first connecting shaft, and the soil crushing wheel combined structure is rotatably connected to lower arms of the first and second crank brackets via a rotary shaft and is disposed below the connecting bracket, and wherein the strip soil loosening and crushing mechanism is adapted to be installed in a front portion of a no-tillage planting machine.

2. The strip soil loosening and crushing mechanism of claim 1, wherein the first cutter head and the first cutter head fixing shaft are connected via a bearing installed in a bearing housing in an interference fit; the bearing housing is connected to an outer surface of the first cutter head by bolts; an inner surface of the first cutter head abuts against a shaft shoulder of the first cutter head fixing shaft; and a fastening nut is provided at a tip of the first cutter head fixing shaft to limit a position of the first cutter head.

3. The strip soil loosening and crushing mechanism of claim 1, wherein the first cutter head comprises a base and a plurality of blades extending from the base, wherein tips of the plurality of blades are located on an imaginary circle.

4. The strip soil loosening and crushing mechanism of claim 1, wherein the spring combined structure of the soil crushing wheel assembly comprises a baffle, two pulling rods extending through the baffle, two springs each sleeving over one of the two pulling rods and abutting a first side of the baffle, and wherein each of the two pulling rods further comprises a pulling rod splint rotatably connected to one of the first and second crank bracket through the first connecting shaft.

5. The strip soil loosening and crushing mechanism of claim 1, wherein the soil crushing wheel combined structure of the soil crushing wheel assembly comprises a wavy disc coulter, a first tooth-shaped soil crushing roller and a second tooth-shaped soil crushing roller, wherein the first and second tooth-shaped soil crushing rollers clamp the wavy disc coulter and are connected by bolts; axial projections of tooth tips of the first and second tooth-shaped soil crushing rollers are evenly and alternately distributed; and a radial dimension of the wavy disc coulter is greater than that of the tooth-shaped soil crushing rollers.

6. The strip soil loosening and crushing mechanism of claim 5, wherein the wavy disc coulter is composed of four wavy disc coulter head pieces evenly distributed and installed between the first and second tooth-shaped soil crushing rollers.

7. The strip soil loosening and crushing mechanism of claim 6, wherein four recesses are provided in inner sides of the first and second tooth-shaped soil crushing rollers respectively, each of the four recesses receives a portion of one of the four wavy disc coulter head pieces.

* * * * *